(No Model.) 2 Sheets—Sheet 1.
W. H. HOLSCLAW.
DISK CULTIVATOR.
No. 590,191. Patented Sept. 14, 1897.
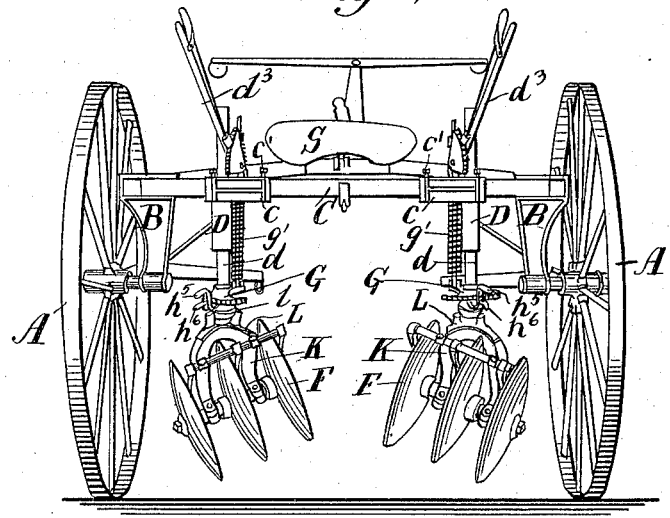
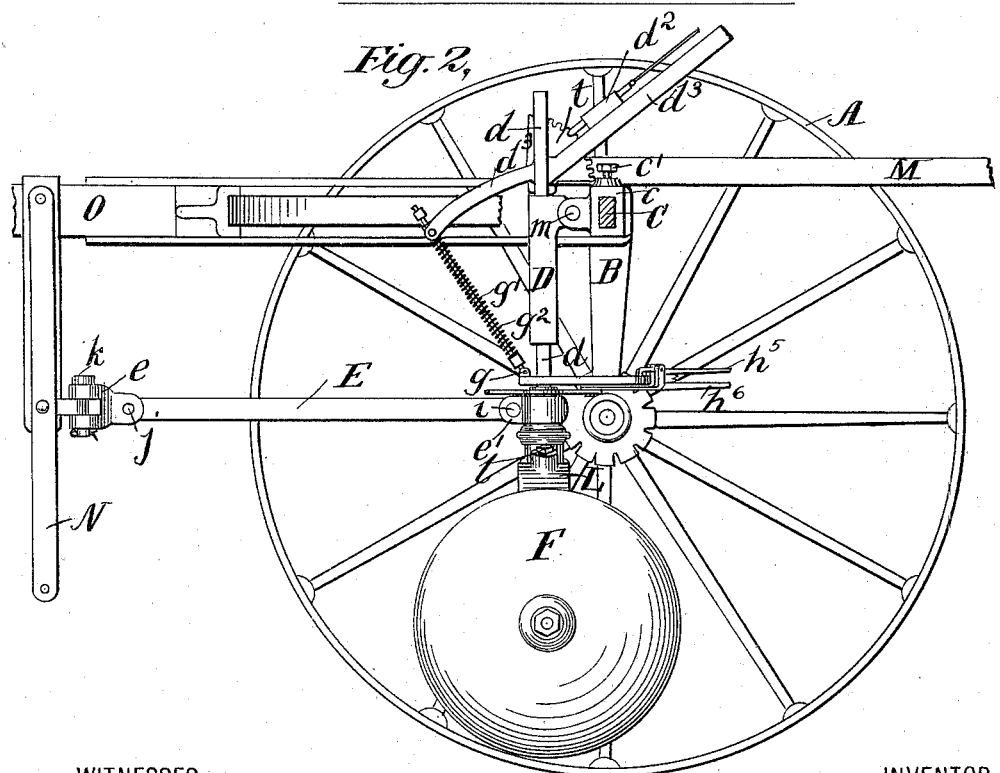
WITNESSES:
INVENTOR
W. H. Holsclaw
BY
J. N. McIntire
ATTORNEY

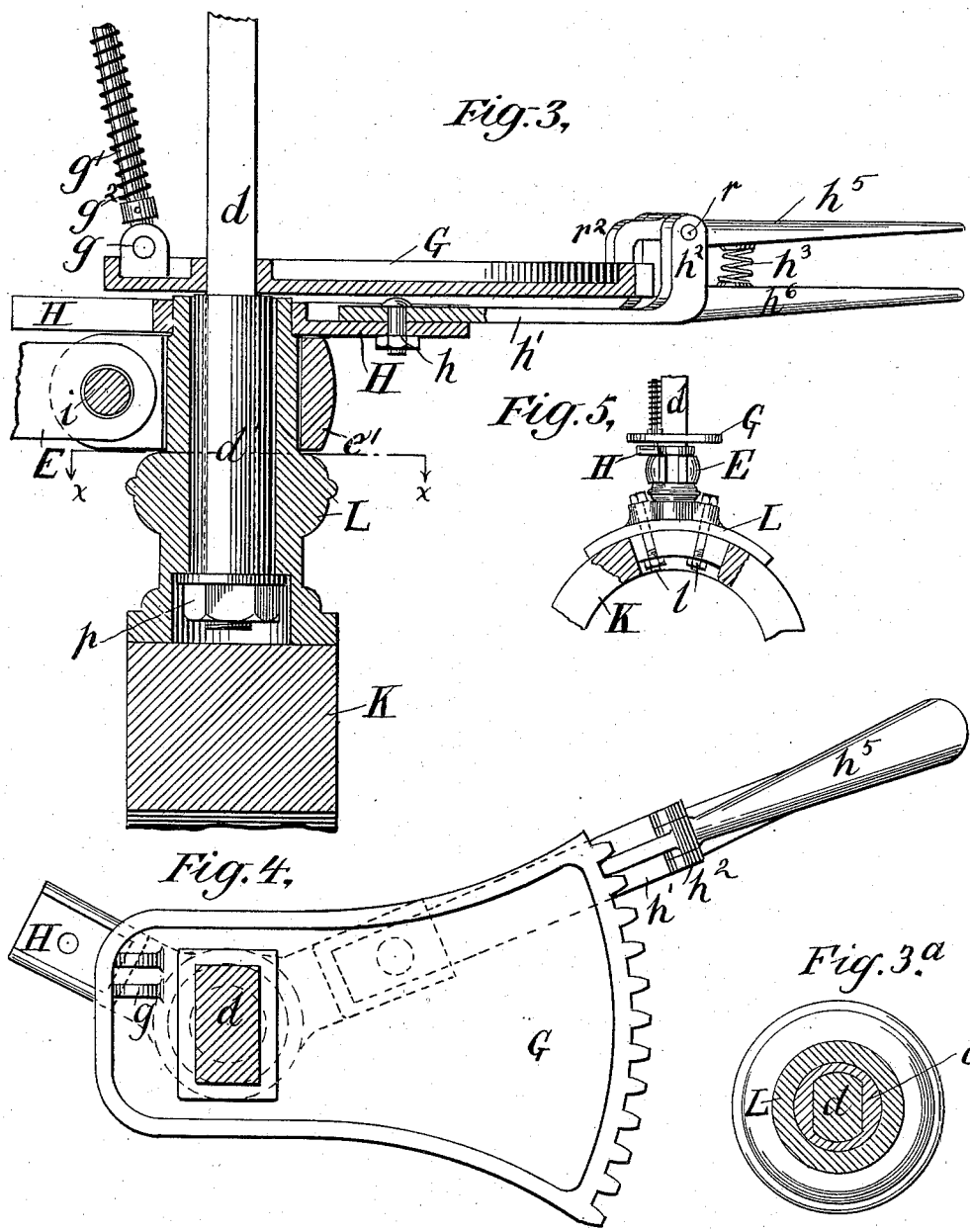

UNITED STATES PATENT OFFICE.

WILFORD H. HOLSCLAW, OF LOUISVILLE, KENTUCKY, ASSIGNOR TO THE B. F. AVERY & SONS, OF SAME PLACE.

DISK CULTIVATOR.

SPECIFICATION forming part of Letters Patent No. 590,191, dated September 14, 1897.

Application filed April 24, 1897. Serial No. 633,676. (No model.)

*To all whom it may concern:*

Be it known that I, WILFORD H. HOLSCLAW, a citizen of the United States, residing at Louisville, in the county of Jefferson and State of Kentucky, have invented a certain new and useful Improvement in Disk Cultivators, of which the following is a full, clear, and exact description, reference being had to the accompanying drawings, forming part of this specification.

My invention relates to that type of agricultural implements known as "disk cultivators," and has for its objects to improve this kind of machine in various particulars, and especially in the direction of rendering the machine more efficient for all the purposes for which such cultivator is to be used, at the same time providing for use a machine which will be of simple and economic construction, which shall possess great durability, and which shall be exceedingly easy of perfect management by the operator or user thereof.

To these main ends and objects my invention consists in the certain novel devices and combinations of devices which will be found hereinafter fully described, and which will be most particularly pointed out in the claims of this specification.

At the outset it may be remarked that, as is well known to those skilled in the manufacture and use of cultivators, the structural requirements and the principles of operation embraced in the disk cultivator are substantially different in many particulars from what is common to and necessary in all other types.

Heretofore, as far as I know, it has been usual in the construction of disk cultivators (although not the universal practice) to have the machine constructed or provided with some sort of U-shaped beam or drag-bar pivoted forward on the tongue of the frame with some sort of universal joint, said drag-bar being provided with yokes at its rear ends for holding, respectively, the gangs of disks usually so mounted that they could be adjusted in various ways—as, for instance, to suit the angle of the ridge—and also as to have their positions varied for the purpose of throwing more or less dirt either from or toward the row of plants; but in all machines thus constructed it has been found by experience and practice that the presence of such U-shaped beam or drag-bar is exceedingly objectionable, especially during the last stages of the cultivation of the plants, on account of the great liability, if not certainty, of having the plants (after they have grown to a considerable height) torn and injured by contact with this bar or beam of the machine. It has also been learned by experience that in all disk cultivators as heretofore constructed that I know of when the cultivator is being used in rough land where either gang of disks rides over clods or runs over a depression the other gang is affected in its operation, so that the angle of the disks is materially varied, at one time throwing too much dirt and again not enough. The operator is supposed to guide these gangs with his feet to keep them from tearing up the young plants, but practice and experience have shown that no man can force the disk gangs laterally with his feet while the disks are in the ground, and hence all disk cultivators as heretofore made are defective or objectionable in use in the particular just explained. These and other serious objections to the various known constructions of disk cultivators I have successfully overcome in my novel construction of machine, which in actual practice has proven itself far superior in many particulars to any heretofore devised and used for the same purpose that I know of.

To enable those skilled in the art to which my improvements relate to make and use a disk cultivator embodying either in whole or in part the several features or parts of my invention, I will now proceed to more fully describe the latter; referring by letters to the accompanying drawings, which form part of this specification, and in which I have shown my said invention carried into effect in that precise form of machine in which I have so far successfully practiced it.

Figure 1 is a perspective view taken from a point at the rear of the machine of my improved disk cultivator. Fig. 2 is a partial side view of the same on a somewhat enlarged scale. Fig. 3 is a detail sectional view showing particularly the manner of and the means for the attachment of the disk-gang yoke to the lower end of its supporting spindle or bar, together with the means for adjusting the gang to throw more or less dirt toward the row of plants, drawn on a considerably increased scale. Fig. 3ᵃ is a section through a portion of Fig. 3. Fig. 4 is a detail view showing in plan the essential devices exhibited at Fig. 3. Fig. 5 is a detail sectional view of certain parts taken in a vertical plane indicated by the line $x$ $x$ of Figs. 2 and 3.

In the several figures the same part will be found ways designated by the same letter of reference.

A are the wheels of the machine, of the usual size and construction, which are mounted on axles projecting outwardly at either side of the machine from depending arms B B, which project downwardly from and are rigidly attached to the main horizontal bar or beam C of the machine, the said bar C and its depending arms B B constituting, so to speak, the axle-arch of the machine; and from said bar extend forwardly in the usual manner or form the frame, to the forward end of which is securely attached the usual tongue O, from which extend laterally and obliquely downward the usual metallic braces, to the lower ends of which are coupled the draft-bars E, to which latter are pivotally attached, at their forward ends, the usual evener-bars N, to which, by singletrees, is hitched the team for carrying or hauling the machine over the field.

Each one of the draft-bars E is coupled at its forward end to the outer end of the obliquely-descending bars of the tongue by means of two pivotal connections $k$ and $j$ and a coupling-piece $e$, (see particularly Fig. 2,) so as to constitute a universal-joint connection, while the rear end of said draft-bar E is coupled by a horizontal pivot $i$ to a collar-piece $e'$, (see Figs. 2 and 3,) that is free to turn on the upper cylindrical portion of the hollow tubular casting L, all in such manner that the rear ends of said draft-bars are practically coupled to the journal-like portions $d'$ of the disk-gang standard $d$ by a universal joint. Hence whatever movements in various directions may occur in the disk gangs and their supporting-standards $d$ $d$ (and the other gang attachments) are freely permitted by reason of the universal-joint connections between both the rear and forward ends of the draft-bars E to the said disk gangs and to the fixed forward points of attachment of the said draft-bars.

Each of the "cultivating implements," so to speak, is composed, about as usual, of three concavo-convex disks mounted axially on a suitable spindle which is properly carried in or supported by the lower depending arm-like portions of the yoke-like or U-shaped casting K, the upper arched or saddle-like surface of which is bolted upwardly to the curved portion of the casting L by means of suitable bolts and nuts $l$, (see Fig. 5,) which casting L is formed with a centrally and upwardly projecting tubular portion, (see Figs. 3 and 5,) within the bore of which is arranged so as to turn freely therein the cylindrical casting $d'$ on the steel standard-bar $d$, which latter, as shown, is arranged to fit and slide up and down within the vertically-arranged metallic housing D, the latter being pivotally connected at $m$ (see Fig. 2) to the lug-like portion of the sliding carriage $c$, that is adjustably secured by means of clamping-bolts or set-screws $c'$ to the metallic beam C of the axle-arch, (see Figs. 1 and 2,) all as clearly shown.

The journal-like device $d'$ is preferably formed, as shown, of a malleable casting having a cylindrical external surface, around which fits so as to turn freely thereon the tubular portion of casting L, (see Figs. 3 and 3ᵃ,) and an irregularly-shaped bore into which is fitted immovably circumferentially the lower end portion of said steel bar, (marked $d$,) which above this portion is rectangular in cross-section, so that, while it is free to move endwise within the housing D, it is incapable of any turning movement, (see Figs. 2 and 4,) and the casting L, together with the casting $d'$, are securely coupled with the lower end of the said steel standard by means of the nut $p$, which bears against the flanged lower end of casting $d'$ and which is arranged within a recess or depression in the bottom of the casting L, all as best seen at Fig. 3 of the drawings. Securely attached to the upper end of the tubular portion of the casting L is a double-armed adjuster H, by means of which, as will be presently described, the said casting L, which carries one of the disk gangs and its attachments, may be turned or partially rotated round about the vertical journal $d'$ of the steel standard-bar, the said adjuster device H having bolted to one or the other of its two arms, (as occasion may require,) by means of the securing-bolt and nut $h$, (see Fig. 3,) the inner end of the hand-lever $h'$, which is provided with two upturned ear-pieces $h^2$, between the upper ends of which is pivoted at $r$ a vibratory latch-bar $h^5$, which is held in its locking position by means of a spiral compression-spring $h^3$, arranged, as shown at Fig. 3, between its lower surface and the upper side of the projecting portion or extension $h^6$ of the bar or lever $h^7$. The shorter downwardly-bent end $r^2$ of the said latch-bar engages, as clearly shown, (see Figs. 3 and 4,) with a toothed sector G, the apertured hub-like portion of which surrounds and is securely fitted to the lowermost part of the rectangular portion $d$ of the steel standard-bar which supports the disk gang. The forwardly-projecting portion of said sector-plate G is cast or formed, as shown, with two upwardly-projecting lugs or ear-pieces, to which is pivotally connected by the pin $g$ (see Fig. 3) the lower end of the spring presser-bar $g'$, which, as shown, is pivotally connected at its upper end (see Fig. 2) to the forward end of one of the hand-levers $d^3$, by means of which the standard-bar $d$ is raised and lowered, the spiral compression-spring $g^2$, which is arranged, as shown, on the bar $g'$ and confined endwise between two collars on said rod, operating to hold the vertically-adjustable disk gang down to its work in a slightly-yielding manner, as and for purposes well understood.

Each of the vibratory hand-levers $d^3$ is provided, as shown, with a latch-bar $d^2$ or trigger, the lower end of which engages normally with a fixed toothed sector-plate $t$, (see Figs. 1 and 2,) all in such manner that the driver or operator of the machine can, by pressing upon the handle of the latch bar or trigger $d^2$, while at the same time firmly grasping the hand-lever $d^3$, unlock the latter and turn it on its fulcrum to either elevate or depress the sliding steel standard $d$, and thus bodily raise or lower at will the disk gang and all its attachments carried by said standard-bar, and by then releasing the trigger or latch-bar $d^2$ again lock the said standard-bar, thus adjusting or setting the disk gang at any desired elevation, and it will be observed that each of the disk gangs may thus be separately or independently set or adjusted, as circumstances may require.

By having each disk gang suspended directly from the beam C of the axle-arch, as shown, an unobstructed space between the two disk gangs and extending from the surface of the ground clear up to said axle arch or beam is accorded to the growing plants, and therefore, unlike machines heretofore made, my improved machine can be used during the last stages of cultivation of the plants without any danger of interference with or injury to the tops of the latter.

By having the disk gangs arranged to operate wholly independently of each other while thus suspended from the fixed beam C of the machine the action and position of one disk gang cannot be changed or affected by that of the other in cases where one disk gang may have to pass over obstructions or be affected by depressions in the surface of the ground under cultivation, and by having the gangs separately hung, as shown and described, in the two longitudinally-adjustable carriages $c$, the distance between the gangs may be varied at pleasure by simply loosening the clamping-bolts $c'$, sliding the carriages $c$, and then reclamping them to the axle-arch, while at the same time, by reason of the universal-joint connections at the rearward and forward ends of the draft-bars E, not only may these bodily adjustments laterally of the two gangs, with all their attachments, toward and from each other be easily effectuated, but furthermore the vertical adjustment hereinbefore mentioned of each disk gang, as well as all the other adjustments of said gang and the automatic up-and-down movement of each gang separately under the action of the presser device $g'$ $g^2$, may be made and occur without any impediment or any cramping of any of the working parts of the machine.

In order to vary the degree of inclination of the axis or spindle of each disk gang to properly accord with the angle or degree of obliquity of the ridge to be cultivated, it is only necessary to loosen the clamping-bolts $l$, shift the saddle-like or arch-shaped portion of the casting K, and then tighten up again the said clamping-bolts $l$, all in a manner that will be easily understood by those skilled in the art, while to change the position of each gang so as to make the disk throw more or less dirt toward the plants, it is only necessary for the operator or attendant of the machine to grasp the hand-pieces $h^5$ $h^6$ in a manner to lift the sector-engaging end $r^2$ of the lever $h^5$ and to then bodily move or swing these parts laterally so as to cause the arm $h'$ to turn the casting H in one direction or the other, (see Figs. 3 and 4,) whereby the casting L will be rotated more or less on a vertical axis of movement round about the journal-like portion $d'$ of the steel bar or supporting-standard $d$ and the disks of the gang varied in position as may be desired.

Whenever it may become necessary to completely shift or transform the positions of the disks comprising the two disk gangs so as to make them capable of throwing the earth away from the plants, it is only necessary to remove the clamping-bolt and nut $h$, (see Figs. 3 and 4,) then shift or change the position of the disks by revolving the gang with its supporting-casting L and the attached duplex arm of the casting H until that portion of the latter which is seen in full lines at Fig. 4 shall occupy the position now occupied by the portion shown in dotted lines at said figure and to then replace and rebolt the hand-lever or arm $h'$ to the other arm of said casting H, whereupon the parts of the adjusting mechanism will be in a condition such that a manipulation of the parts just as hereinbefore described for the purpose of adjusting the disk gangs to make them throw more or less dirt toward the plants will operate to adjust the gangs so as to throw more or less dirt away from the plants.

Although each of its disk gangs, with its attachments, might be differently suspended in a manner independent of the other gang by means other than the peculiar combination of devices I have shown and described, I have found the novel construction set forth, consisting, essentially, of the vertically-adjustable standard-bar $d$, provided with the cylindrical cast journal $d'$, and the casting L, mounted on the latter so as to turn freely thereon and be held in a pendent condition by the let-in nut and washer $p$, the said casting L being formed with an arc-like bottom plate for the support of the attached arch K of the disk gang, to be simple and economic of construction, very durable, and perfectly efficient in practice; and although other means might be used for shifting each disk gang from the position in which it operates to throw dirt toward the plants to the position in which it throws the dirt away from them, and vice versa, I consider the means shown and described for this purpose an important feature of my invention, as it is not only simple and perfectly efficient but remarkably easy of operation in the field.

In the use of my improved machine, while the draft is always directly on the disk gangs none of the adjustments or variations of position or condition of either the far ends of the draft-bars, or of either or both of the disk-gangs, can possibly impede or affect the perfectly free operations of all the working parts of the machine, or of any movement of the parts of the various adjusting mechanisms embodied in the machine. Therefore my improved machine under all conditions and circumstances is perfect in its operations, while at the same time the various adjusting mechanisms can be manipulated by a man or boy without any difficulty and without the exercise of any mechanical judgment or experience.

The greatest advantages perhaps of my improved machine are in the fact that while in operation neither of the gangs can be affected in its action by the conditions surrounding the operation of the other gang, and the further fact that there is no impediment whatever to the passage of the plants, during the last stages of cultivation, beneath the elevated axle-bar of the machine.

Of course more or less variation of detail may be made in the several parts or devices which I have shown and described without materially changing the novel characteristics of my improved machine, and the machine may be made to embrace either one or all of the several novel features which I have described, and I therefore wish it to be understood that I do not consider my invention as limited to the precise forms and details shown nor to the use in one machine of all of the novel features set forth; but, Having now so fully described my improved disk cultivator that those skilled in the art can make machines embracing my invention either in whole or in part and either in the forms shown and described or under some mere modification of my invention, what I claim as new, and desire to secure by Letters Patent, is—

1. A disk cultivator composed of an arched axle-bar, or frame, substantially such as is shown and described; and two gangs of disks, or cultivator implements, suspended, with their attachments, directly from, or by, said axle-bar, by means of supporting carriage-like devices, which are adjustable laterally on said axle-bar; the whole constructed, arranged, and operating in the manner and for the purpose hereinbefore set forth.

2. In a disk cultivator, the combination, with the beam C of the arched axle-bar, or frame, of two disk gangs supported by sliding carriage-like devices, adjustably mounted on the bar C, and through the medium of the vertical standard, or bar, adjustable endwise within the housings, which are pivotally connected with said carriage-like devices; and means by which through the medium of ordinary hand-levers, the said standard-bars, to the lower ends of which the gangs are hung, may be raised and lowered, and held at different elevations, within said housings; all substantially as and for the purposes hereinbefore set forth.

3. In combination with the gang-supporting standard-bar, capable only, of an up-and-down movement within the housing D, the journal-like device at the lower end of said standard-bar; the disk gang supported vertically thereby, but free to turn axially thereon; and the universal-joint coupling, which connects the casting L of the disk gang, to the rear end of the draft-bar E; all substantially as and for the purposes hereinbefore set forth.

4. In combination with the casting, or part of the disk gang, which is pendently supported by the lower end of the vertically-adjustable standard-bar $d$, and that is free to turn on the journal-like casting $d'$ on said bar; and the rigidly-attached double-armed device, H; the sector-plate G, mounted on the rectangular portion $d$ of the gang-supporting standard; the removable arm, or lever, $h'$, adapted to be secured, at pleasure, to either one of the two arms of the part H; and suitable means for locking, or engaging, said arm $h'$, with the teeth of the sector-plate G; all substantially as and for the purposes hereinbefore described.

5. The combination, with the disk-supporting casting L, mounted on the journal-like portion $d'$ of the gang-supporting standard of the yoke-like, or arched, device K, in the lower portion of which is mounted the disk spindle, and the upper arched portion of which is adjustably secured to the lower curved portion, or base-plate of the casting L; all substantially as and for the purposes hereinbefore described.

6. In combination with the disk gang, which is both vertically and laterally adjustable bodily, relatively to the axle-arch; the draft-bar E, connected at its rear end to said disk gang, by a universal-joint coupling, and also connected at its forward end to the draft device of the machine, by means of a universal-joint coupling; all substantially as and for the purposes hereinbefore set forth.

In witness whereof I have hereunto set my hand.

W. H. HOLSCLAW.

In presence of—
 W. A. STORTS,
 A. G. RENAU.